(12) United States Patent
Slowik

(10) Patent No.: US 10,306,917 B2
(45) Date of Patent: Jun. 4, 2019

(54) ROTARY CONVEYOR DRUM FOR USE IN TOBACCO INDUSTRY MACHINES, METHOD AND APPARATUS FOR TRANSPORTING ROD-LIKE ELEMENTS USING SUCH DRUM AND MACHINE FOR MANUFACTURING MULTI-ELEMENT RODS

(71) Applicant: International Tobacco Machinery Poland Sp. z.o.o., Radom (PL)

(72) Inventor: Jacek Slowik, Mleczków (PL)

(73) Assignee: INTERNATIONAL TOBACCO MACHINERY POLAND SP. Z O.O., Radom (PL)

( * ) Notice: Subject to any disclaimer, the term of this patent is extended or adjusted under 35 U.S.C. 154(b) by 1066 days.

(21) Appl. No.: 14/414,237

(22) PCT Filed: Jul. 11, 2013

(86) PCT No.: PCT/EP2013/064700
§ 371 (c)(1),
(2) Date: Jan. 12, 2015

(87) PCT Pub. No.: WO2014/009482
PCT Pub. Date: Jan. 16, 2014

(65) Prior Publication Data
US 2015/0181926 A1    Jul. 2, 2015

(30) Foreign Application Priority Data
Jul. 12, 2012  (PL) .......................................... 399920

(51) Int. Cl.
| A24C 5/32 | (2006.01) |
|---|---|
| A24C 5/46 | (2006.01) |
| A24D 3/02 | (2006.01) |
| B65G 47/30 | (2006.01) |
| B65G 47/84 | (2006.01) |

(52) U.S. Cl.
CPC ................ *A24C 5/327* (2013.01); *A24C 5/46* (2013.01); *A24D 3/0287* (2013.01); *B65G 47/30* (2013.01); *B65G 47/846* (2013.01)

(58) Field of Classification Search
None
See application file for complete search history.

(56) References Cited

U.S. PATENT DOCUMENTS

| 3,921,791 A | 11/1975 | Bornfleth et al. |
| 5,860,506 A * | 1/1999 | Bailey ................... B65B 19/105 198/450 |

(Continued)

FOREIGN PATENT DOCUMENTS

| CN | 1406529 A | 4/2006 |
| CN | 1972606 A | 5/2007 |

(Continued)

OTHER PUBLICATIONS

International search report, in corresponding application No. PCT/EP2013/064700, dated Nov. 7, 2013.

*Primary Examiner* — Phu H Nguyen
(74) *Attorney, Agent, or Firm* — Browdy and Neimark, PLLC

(57) ABSTRACT

Rotary conveyor drum (19, 119, 219, 319, 419, 519, 59) for use in tobacco industry machines, for transferring a stream of rod-like elements (S), the drum having a first front base and a second front base and a lateral surface (20, 120, 220, 320, 420, 520, 50) onto which the rod-like elements (S) are delivered successively one by one, the lateral surface (20, 120, 220, 320, 420, 520, 50) being provided with spacer projections (22, 122, 222, 322, 422, 522, 52) between which the rod-like elements (S) are conveyed, the drum (19, 119, 219, 319, 419, 519, 59) being equipped with guiding means (21, 51) forcing the rod-like elements (S) to travel from the first front base to the second front base of the drum (19, 119,

(Continued)

219, 319, 419, 519, 59) during the rotation of the drum while the rod-like elements (S) are oriented substantially transversally to the spacer projections (22, 122, 222, 322, 422, 522, 52). The invention also relates to an apparatus comprising such a drum, to a machine for manufacturing multi-element rods and a method of transferring a stream of rod-like elements.

14 Claims, 9 Drawing Sheets

(56) References Cited

U.S. PATENT DOCUMENTS

2005/0282693 A1* 12/2005 Garthaffner .......... A24D 3/0225
493/39
2012/0077659 A1  3/2012 Yanchev et al.

FOREIGN PATENT DOCUMENTS

| | | |
|---|---|---|
| CN | 101065028 A | 10/2007 |
| DE | 2232960 A1 | 1/1974 |
| EP | 1763306 B1 | 11/2009 |
| EP | 2210509 A1 | 7/2010 |
| EP | 2251283 B1 | 2/2012 |
| JP | 2012513749 A | 6/2012 |
| RU | 2048781 C1 | 11/1995 |
| RU | 2220631 C2 | 1/2004 |
| UA | 79209 C2 | 5/2007 |
| WO | 2006000918 A2 | 1/2006 |
| WO | 2006056271 A1 | 6/2006 |
| WO | 2010076653 B1 | 7/2010 |

* cited by examiner

ROTARY CONVEYOR DRUM FOR USE IN TOBACCO INDUSTRY MACHINES, METHOD AND APPARATUS FOR TRANSPORTING ROD-LIKE ELEMENTS USING SUCH DRUM AND MACHINE FOR MANUFACTURING MULTI-ELEMENT RODS

The present invention relates to a rotary conveyor drum for transferring rod-like elements for use in tobacco industry machines. The present invention relates further to an apparatus comprising such a drum, to a method of transferring a stream of rod-like elements with the use of such a drum as well as a machine for manufacturing multi-element rods making use of the apparatus according to the invention.

The present invention relates in particular to transferring rod-like elements from one conveyor device to another in the machines used in the tobacco industry. The rod-like elements referred to in the present document are to be understood as being filter any of the following: rods or filter segments of cut filter rods, multi-element filter rods, tobacco rods or their fragments, any other rod-like elements of tobacco industry or their combinations.

It is widely known in the tobacco industry to arrange rod-like elements into groups composed of a limited number of the elements or into endless strings of alternating different or identical elements. The elements forming the groups or strings may be filter elements having different filtration properties or filter elements alternating with tobacco elements. The endless strings of elements are wrapped in paper. Then, they are subject to further treatment, the first stage of which is cutting them into sections having a repeatable sequence of elements.

There is a need in tobacco industry to have the rod-like elements arranged without spaces therebetween or spaced apart by pre-defined distances.

In the case of the rod-like elements delivered without spaces therebetween it is essential, though very difficult, to have the elements driven close to one another in a repeatable way. It is equally difficult to produce strings of rod-like elements with the spaces between the elements having various lengths, if the elements must be delivered and arranged in a repeatable way.

By "delivered in a repeatable way" it should be understood that the elements are to be arranged and delivered in such a way that their final position in a string is not influenced by any incidental factors. In the case of a string of elements without spaces therebetween, an undesired effect that may be caused by the incidental factors may consist in that random spaces are formed between the elements or, that the elements are excessively pressed to one another and deformed which is detrimental to the quality of final products.

In the case of a string of elements with pre-defined spaces, the undesired effect may consist in that the elements are randomly shifted so that the lengths of the spaces are changed which is detrimental to the quality of final products.

With regard to arranging strings of rod-like elements, apparatuses for transferring the rod-like elements from one longitudinal conveyor to another are known in the art.

An example of an apparatus for transferring groups of rod-like elements, in particular filter elements, and forming endless strings of elements is known from EP 1 763 306 B1. In this case, the spaces between groups of elements are purposefully maintained, the groups being transferred by means of rotational members consisting of wheels equipped with notches on their peripheries for receiving the groups of elements and with spacer teeth having a constant width.

Document US 2005/0282693 discloses a similar apparatus for transferring individual filter elements with the spaces left therebetween, the spaces being subsequently filled with a granulate e.g. activated carbon constituting an additional filtering means.

Document WO 2010/076653 also discloses an apparatus for transferring groups of elements between two conveyors. A method of eliminating the spaces between groups of elements is disclosed, the spaces having been formed by the dividers located between the notches on the transfer wheels. This is achieved by adjusting the speed of the conveyor belt of the transport device collecting the groups of elements. Due to the fact that the speed of this belt is lower than the peripheral speed of the wheel, the elements delivered by the last transfer wheel are pressed against the elements in front of them. The elements are then moved along a wrapper paper moving at the speed of the belt. The wrapper paper is usually covered with glue hindering their movement, that may be gathered between the elements.

The aim of the present invention is to provide a rotary conveyor drum for transferring the rod-like elements between conveyor devices as well as an improved apparatus and method for transporting rod-like elements using such a drum, enabling delivery of the rod-like elements to the outlet conveyor in such a way that shifting the elements on the wrapper paper will not be necessary.

Another aim of the invention to provide an apparatus and a method enabling elimination of the spaces between the individual elements transported in a string one after another.

Still another aim of the invention is to provide a machine for manufacturing multi-element rods making use of the apparatus according to the invention.

According to the invention a rotary conveyor drum is provided for use in tobacco industry machines, for transferring a stream of rod-like elements, the drum having a first front base and a second front base and a lateral surface onto which the rod-like elements are delivered successively one by one, the lateral surface being provided with spacer projections forming channels therebetween in which the rod-like elements are conveyed, the drum being equipped with guiding means forcing the rod-like elements to travel from the first front base to the second front base of the drum during the rotation of the drum while the rod-like elements are oriented substantially transversally to the spacer projections.

Preferably, the channels between the spacer projections have a constant width.

The thickness of the spacer projections preferably varies along the channels.

The thickness of the spacer projections may decrease substantially to zero in the direction of the travel of the rod-like elements in the channels.

The thickness of the spacer projections may also increase in the direction of the travel of the rod-like elements in the channels.

Preferably, the height of the spacer projections decreases substantially to zero in the direction of the travel of the rod-like elements in the channels.

Preferably, the guiding means is constituted by a shield enclosing at least partly the lateral surface of the drum, the shield being preferably fixed and being spaced from the lateral surface so as to enable the rotation of the drum.

The shape of the lateral surface of the drum is preferably selected from a group comprising: at least one frustum, a cylinder, a hyperboloid surface and a combination of at least two surfaces from the group.

According to the invention an apparatus for transporting a stream of rod-like elements is provided comprising a drum according to the invention.

In another aspect of the invention, an apparatus is provided for transporting a stream of rod-like elements in tobacco industry machines, in which the rod-like elements are transported successively one by one, the apparatus comprising at least two transfer wheels arranged so that the rod-like elements are conveyed from one wheel to the other, the peripheries of the wheels being adapted to convey the rod-like elements arranged one after another, characterized in that it comprises a rotary conveyor drum having a first front base and a second front base and an axis of rotation that is slanted in relation to the axis of rotation of the neighboring transfer wheel, and a lateral surface provided with spacer projections forming channels of a constant width therebetween for receiving the successive rod-like elements, the drum being equipped with guiding means forcing the rod-like elements to travel in the channels during the rotation of the drum, the wheel and the drum are arranged in such a way that during their rotation in opposite directions around their axes, the drum receives the successive rod-like elements from the periphery of the wheel into the successive channels of its lateral surface, the rod-like elements, oriented substantially transversally to the spacer projections being conveyed along these channels during the rotation of the drum, the thickness of the spacer projections varying along the channels.

Preferably, the thickness of the spacer projections decreases substantially to zero in the direction of the travel of the rod-like elements in the channels.

Also preferably, the height of the spacer projections decreases substantially to zero in the direction of the travel of the rod-like elements in the channels.

The thickness of the spacer projections may increase in the direction of the travel of the rod-like elements in the channels.

Preferably, the lateral surface of the drum has a form of a frustum, the spacer projections being elongated and extend substantially from the first front base to the second front base of the frustum.

The guiding means may be constituted by a shield enclosing at least partly the lateral surface of the drum, the shield being preferably fixed and being spaced from the lateral surface so as to enable the rotation of the drum.

Preferably, the shape of the lateral surface of the drum is selected from a group comprising: at least one frustum, a cylinder, a hyperboloid surface and a combination of at least two surfaces from the group.

The shape of the lateral surface of the drum may preferably be a combination of two frustums or a frustum and a cylinder, and the spacer projections extend along broken lines on the lateral surface of the drum (319.

Preferably, the spacer projections extend along straight lines being the frustum generating lines.

The spacer projections may be arranged at least partially slanted to the lateral surface generating lines.

The spacer projections may also extend on the lateral surface of the drum along hyperbolic lines.

The apparatus may preferably be equipped with an longitudinal conveyor element for collecting the successive groups of elements directly from the successive channels of the lateral surface of the drum.

Preferably, the apparatus comprises a longitudinal conveyor for feeding the rod-like elements onto the wheel.

In another aspect of the invention a method of transporting a stream of rod-like elements in the tobacco industry machines is provided in which the rod-like elements are transported successively one by one on the peripheries of at least two transfer wheels, the rod-like elements being arranged one after the other, characterized in that the successive rod-like elements are subsequently transferred onto a rotary conveyor drum having a lateral surface provided with spacer projections forming channels for receiving the successive rod-like elements that are conveyed one by one during the rotation of the drum, on the lateral surface and along the channels, the rod-like elements being oriented substantially transversally to the spacer projections and in that the distances between the successive rod-like elements are changed during their travel on the lateral surface.

Preferably, the distances between the successive rod-like elements are decreased substantially to zero during their travel on the lateral surface.

The distances between the successive rod-like elements may also be increased during their travel on the lateral surface.

Preferably, the rod-like elements are transferred onto a rotary conveyor drum having an axis of rotation that is slanted in relation to the axis of rotation of the transfer wheel, and a lateral surface provided with spacer projections forming channels of a constant width therebetween, the rod-like elements being transferred directly from the periphery of the wheel into the successive channels between the spacer projections, the rod-like elements oriented substantially transversally to the spacer projections being conveyed along these channels during the rotation of the drum.

Preferably, the rod-like elements are transferred from the drum to the longitudinal conveyor element that collects the elements lying in line, directly from the successive channels of the lateral surface of the drum, so that on the longitudinal conveyor element the successive rod-like elements are arranged in a stream without the spaces therebetween.

The rod-like elements may also be transferred from the drum to the longitudinal conveyor element that collects the elements lying in line, directly from the successive channels of the lateral surface of the drum, so that on the longitudinal conveyor element the successive rod-like elements are arranged in a stream with the spaces therebetween.

According to the invention a machine is also provided for manufacturing multi-element rods, comprising: at least one feeder for the rod-like elements, a feeding conveyor associated with the apparatus according to the invention, a receiving conveyor, a device for forming a multi-element continuous rod and a device for cutting the multi-element continuous rod into single rods.

Thanks to the invention in all its aspects, it is possible to control the spaces between the rod-like elements transported in a stream one after another, and in particular, to arrange the rod-like elements in a string without spaces therebetween, without the need to slow down the transfer speed in order to shift them towards each other. It is also possible to vary the spacing between the elements during the transfer. The elements are delivered to the outlet collecting device with a highly repeatable spacing that does not require further correction.

Preferred embodiments of the invention are presented in the appended drawing in which.

Figure 1:
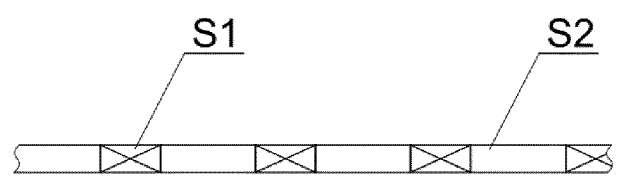
FIG. 1 shows an exemplary string of the rod-like elements without free spaces.
Figure 2:
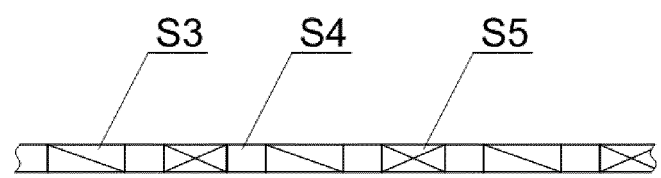
FIG. 2 shows another exemplary string of the rod-like elements without free spaces.

FIGS. 1 and 2 present fragments of exemplary continuous multi-element rods composed of filter elements S1, S2, S3, S4 and S5 produced by means of an apparatus according to the invention.

Figure 3:
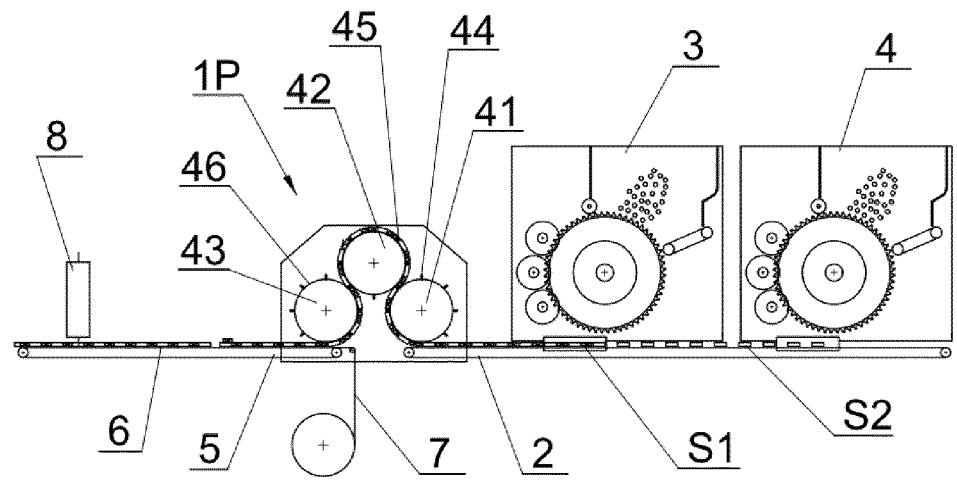
FIG. 3 shows a known apparatus for producing a string of rod-like elements forming one continuous multi-element rod.

FIG. 3 shows a known in the prior art apparatus for producing multi-element filter sections, the apparatus being equipped with a device 1P for transferring the filter elements S1, S2 that are delivered by a feeding conveyor 2 in the form of strings of elements S1, S2 that are transferred in a spaced apart configuration, the elements S1, S2 being fed to the feeding conveyor 2 by feeding assemblies 3, 4. The device 1P comprises three wheels 41, 42, 42, the wheel 41 receiving the elements S1, S2 from the feeding conveyor 2. The wheel 41 is provided with peripheral spacer elements 44 having a width smaller than the free spaces between the elements S1, S2 while on the feeding conveyor 2. The wheels 42, 43 have their spacer elements 45 and 46 respectively of a width similar to that of the elements 44. The device 1P transfers the filter elements S1, S2 to a receiving conveyor device 5. If a need exists for the segments to be abutting one another end to end after having been received by the conveyor device 5, the elements must be received with a speed that is lower than the peripheral speed of the wheel 43. The elements S1, S2 are arranged one after another and are wrapped with a paper 7 which results in the endless multi-element rod 6 being produced. The rod 6 is cut by means of a cutting head 8. The obtained multi-element rods are collected by a collecting device (not shown). On the other hand, if a need exists for free spaces to be left between the elements or groups of the elements, the speed of collecting the elements is equal or higher than the peripheral speed of the wheel and the free spaces between the elements is equal or bigger than the width of the spacer elements on the wheels.

Figure 4:
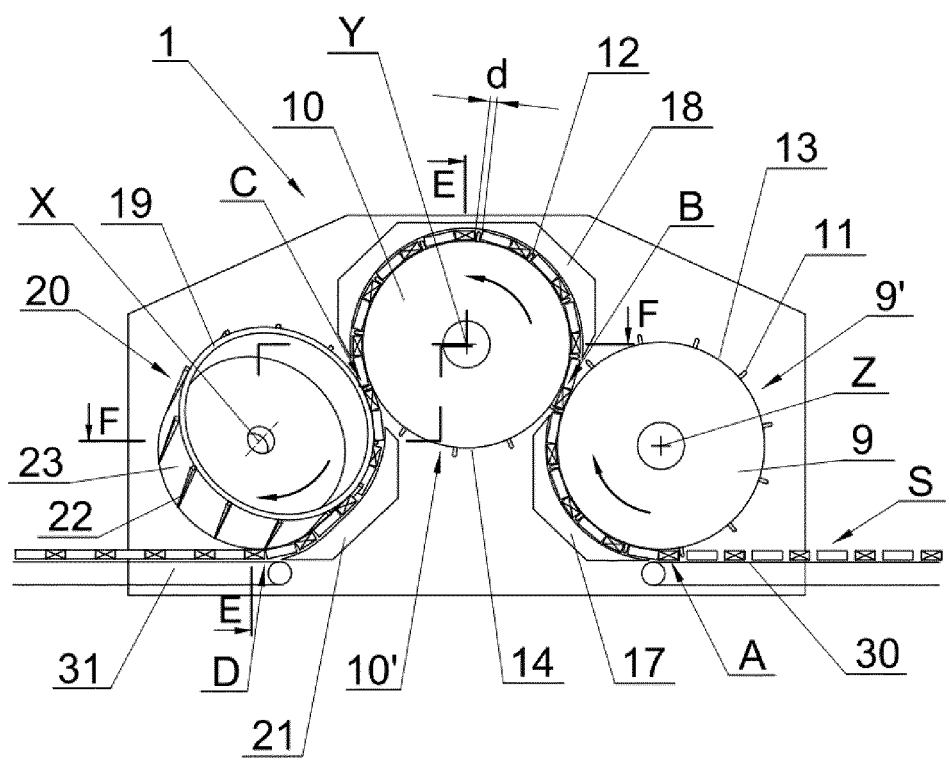
FIG. 4 shows a first embodiment of the apparatus for transporting rod-like elements according to the invention.
Figure 7:
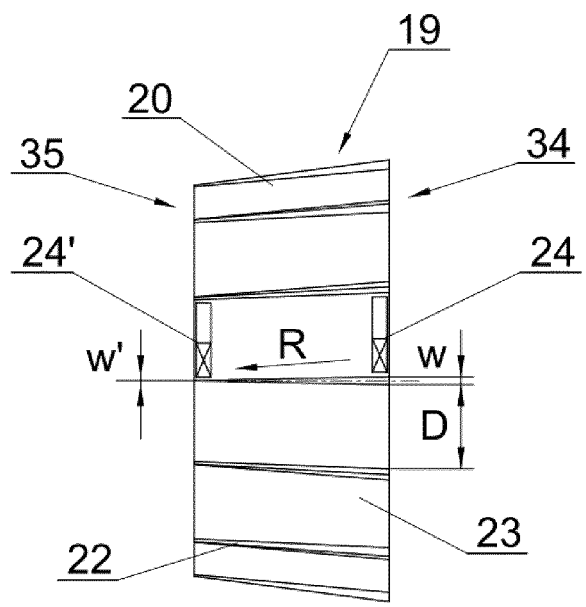
FIG. 7 shows an embodiment of the rotary drum according to the invention having a frustum lateral surface with spacer projections extending along the frustum generating lines.

FIG. 4 shows a first embodiment of the apparatus for transporting rod-like elements according to the invention. A first rotational transfer element and an intermediate rotational transfer element have a form of transfer wheels respectively 9 and 10, equipped on their peripheries with spacer projections in the form of teeth 11 and 12 and with notches 13 and 14. The wheels 9 and 10 rotate in mutually opposite directions around their axes respectively 15 and 16 which are substantially parallel to each other. Shields (guides) 17, 18 are located so as to partially surround the peripheries of the wheels 9 and 10 in order to guide the elements S. A third and the last rotational transfer element 19 has a form of a rotary drum with a lateral surface 20, in this embodiment having the shape of a frustum and provided with spacer projections 22 and channels 23. The spacer projections 22 have a varying thickness. In the shown embodiment the thickness of the spacer projections 22 changes form the size "w" on the side of the larger base surface of the frustum-shaped transfer element 19, down to the size "w'" on the side of the smaller base surface of the element 19 (FIG. 7). The external lateral surface 20 of the drum may be frustum shaped, but it may also be composed of two frustum surfaces, a frustum surface and a cylindrical surface or a hyperboloid surface. Guiding means forcing the rod-like elements to travel on the lateral surface are surrounding a part of the lateral surface of the drum. The guiding means is in particular an enclosure (guide) 21 for guiding the elements S. Another means that is typically used for supporting the elements on cylindrical or circular surfaces, is negative pressure applied to the elements.

The transfer of the rod-like elements in the apparatus according to the invention is realized successively in the points A, B, C and D. The elements are transferred in groups one after another, each group being composed of one or more rod-like elements. In point A the individual elements or groups of the elements 24 are transferred from the feeding conveyor 30 shown schematically as a conveyor belt, into the notches 13 located on the lateral peripheral surface 9' of the wheel 9. If the elements S are transferred to the notches 13 in groups, the individual elements of each group are shifted toward one another so that they abut one another end to end and fill up the length of the notch 13. This is achieved by adjusting the peripheral speed of the wheel 9 so that it is lower than the speed of the conveyor 30.

In point B, the elements S are transferred from the notches 13 located on the lateral peripheral surface 9' of the wheel 9 into the notches 14 of the intermediate rotational transfer element or the wheel 10. In point C, the elements S are transferred from the notches 14 located on the lateral peripheral surface 10' of the wheel 10 into the channels 23 located on the last rotational transfer element or the drum 19. In point D, the elements S are transferred from the channels 23 of the drum 19 into the collecting conveying device 31 shown schematically as a conveyor belt. During the transfer of the elements between the points C and D, the groups of elements 24 (FIG. 7) are moved along the channels 23 formed between the spacer projections 22, from the base surface 34 of the drum 19 to the other base surface 35 thereof, in the direction R and oriented substantially transversally to the spacer projections 22. This movement is made easier if the axis of rotation X of the drum 19 is slanted in relation to the axis of rotation Y of the wheel 10 and due to the guide means 21 forcing the elements to move when the drum rotates.

Figure 5:
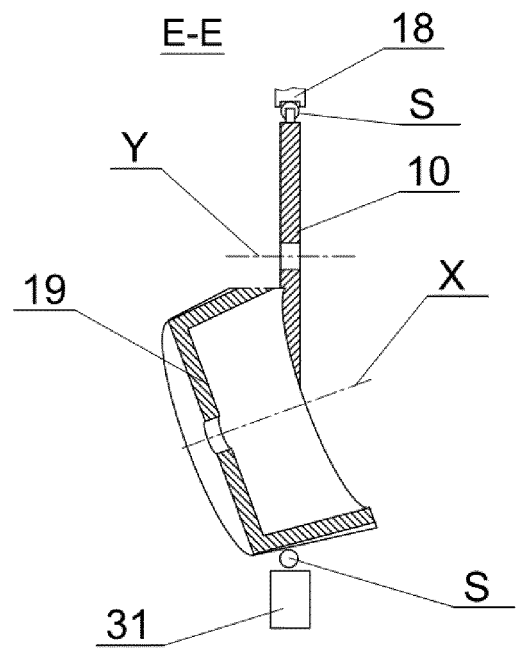
FIG. 5 shows a vertical cross-section through a wheel and a drum of the apparatus for transporting rod-like elements of FIG. 4.
Figure 6:
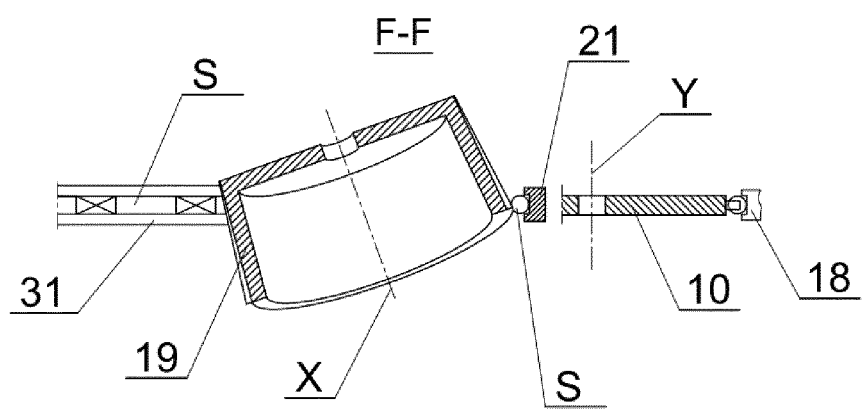
FIG. 6 shows a horizontal cross-section through a wheel and a drum of the apparatus for transporting rod-like elements of FIG. 4.

In FIG. 5 a vertical cross-section E-E (as indicated in FIG. 4) of the wheel 10 and the drum 19 is presented, showing the inclination of the axis X of the drum 19 while the axis Y is substantially horizontal. The inclination of the axis X in relation to the axis Y in plan view is shown in FIG. 6 presenting the cross-section F-F (as indicated in FIG. 4).

FIG. 7 shows an exemplary embodiment of the rotary drum according to the invention. The drum 19 is shown having a lateral surface 20 in the shape of a frustum, with the spacer projections 22 extending thereon along the generating lines of the frustum. An exemplary group of two rod-like elements 24 is also shown, oriented as in the transfer point C and another exemplary group of two rod-like elements 24' oriented as in the transfer point D. In the case of short groups of elements, the fact that the axes of the elements are not parallel to the base surface 34 of the drum is negligible. It should be noted that in the case of a group of two or more elements, they abut one another end to end.

Figure 8:
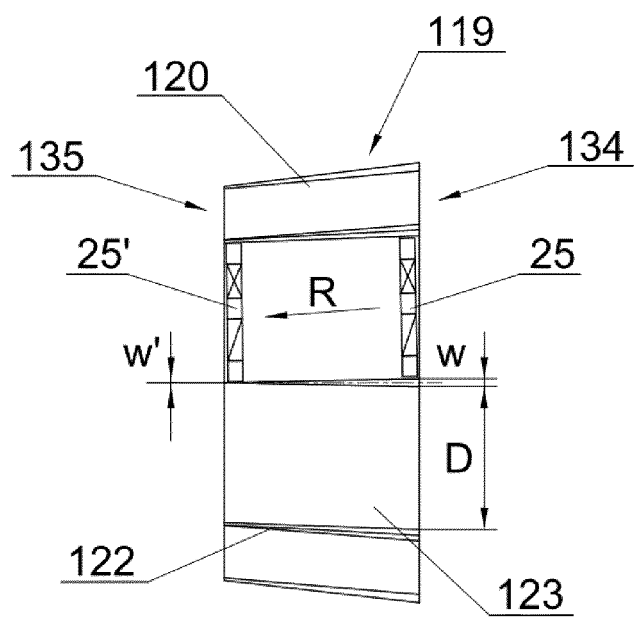
FIG. 8 shows another embodiment of the rotary drum according to the invention having a frustum lateral surface with spacer projections extending along the frustum generating lines that may be used in the apparatus of FIG. 4.
Figure 9:
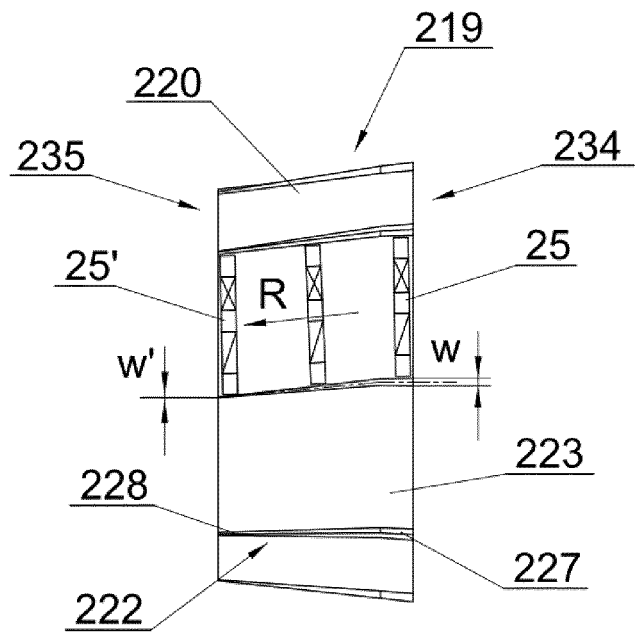
FIG. 9 shows still another embodiment of the rotary drum according to the invention having a frustum lateral surface with spacer projections forming broken lines extending partly along the frustum generating lines that may be used in the apparatus of FIG. 4.

FIG. 8 shows an exemplary embodiment of the drum 119 in which a longer group of elements 25 is conveyed in the channel 123 between the spacer projections 22. On the side of the base surface 134 the group of elements 25 is shown oriented as in the transfer point C, while on the side of the base surface 135 the group of elements 25' is shown oriented as in the transfer point D. In order to make the movement along the channel 223 smoother (FIG. 9) the spacer projections 222 provided on the lateral surface 220 of the drum 19 may extend along a broken line a part 227 of which extends along a generating line of the frustum and a part 228 is slanted thereto (FIG. 9).

Figure 10:
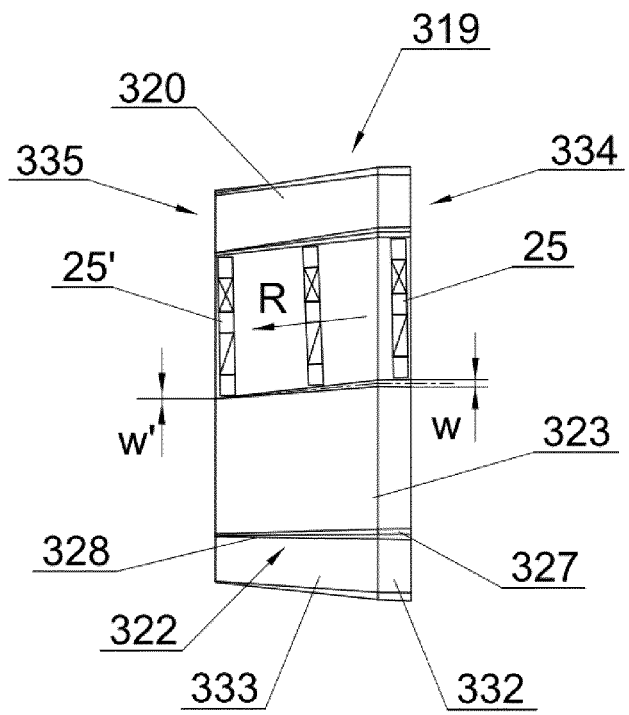
FIG. 10 shows another embodiment of the rotary drum according to the invention having a lateral surface consisting of a combination of a frustum and a cylinder, with spacer projections extending along the cylinder and slanted in relation to the frustum generating lines that may be used in the apparatus of FIG. 4.

In another embodiment shown in FIG. 10, the lateral surface 320 of the drum 319 is composed of a cylindrical surface 332 and a frustum surface 333. In this embodiment the part 327 of the spacer projection 322 extends along a generating line of the cylinder 332, while the part 328 of the spacer projection 322 extends along a generating line of the frustum 333.

Figure 11:
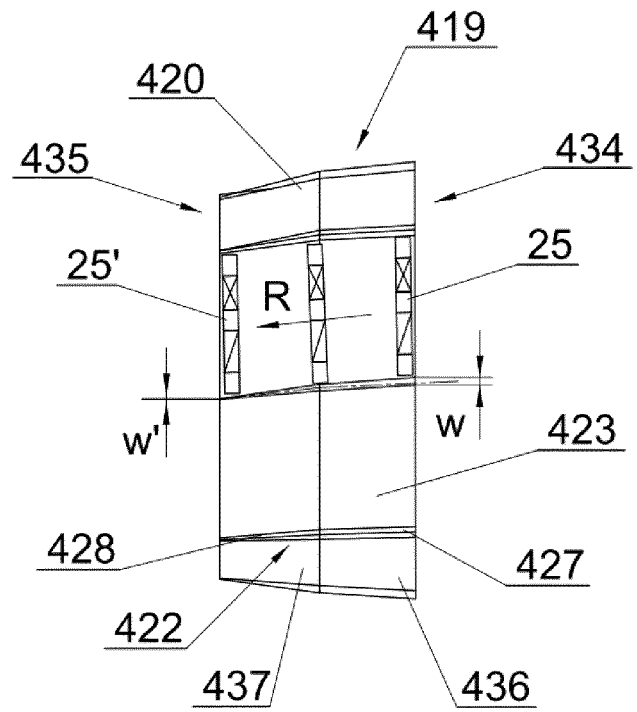
FIG. 11 shows another embodiment of the rotary drum according to the invention having a lateral surface consisting of a combination of two frustums, with spacer projections slanted in relation to the respective frustums generating lines that may be used in the apparatus of FIG. 4.

In still another embodiment shown in FIG. 11, the lateral surface 420 of the drum 419 is composed of two frustum surfaces 436 and 437. The parts 427 and 428 of the spacer projections may extend along generating lines of the respective frustums or may be slanted thereto.

Figure 12:
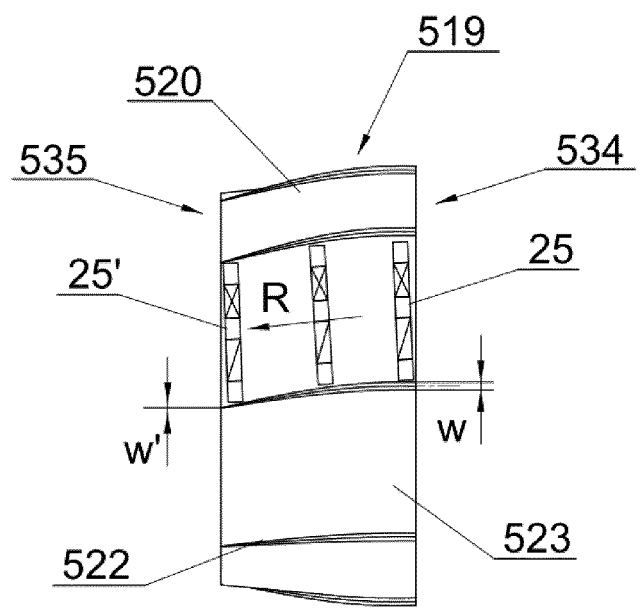
FIG. 12 shows the rotary drum according to the invention having a hyperboloid lateral surface with hyperbolic spacer projections that may be used in the apparatus of FIG. 4.

The drum 519 of a next embodiment shown in FIG. 12 has its lateral surface 520 designed as a hyperboloid, the spacer projections 522 being hyperbolic.

All the foreseen above spacer projections 22, 222, 322, 422 and 522 have their thickness decreasing from w on the side of the base surface 34, 134, 234, 334, 434 and 534 to w' on the side of the base surface 35, 135, 235, 335, 435 and 535, the w' being in particular equal to zero.

Figure 13A:
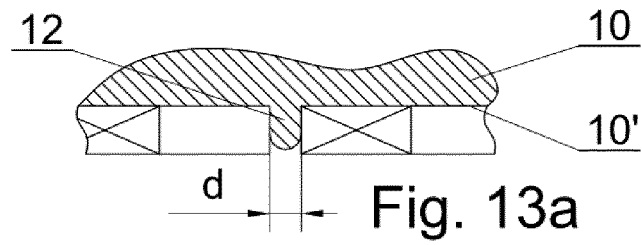
FIGS. 13a-13f show successive stages of conveying the rod-like elements in the apparatus according to the first embodiment shown in FIG. 4.
Figure 13B:
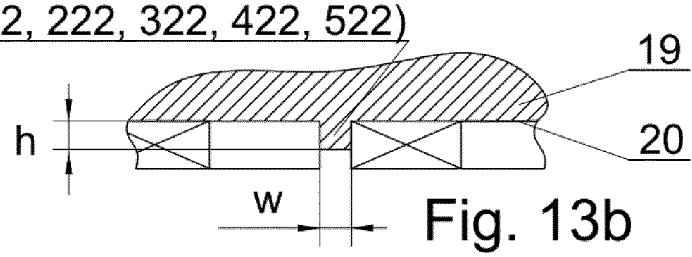
Figure 13C:
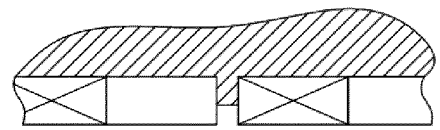
Figure 13D:
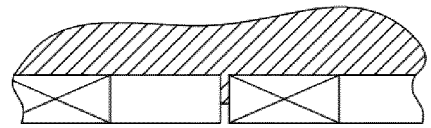
Figure 13E:
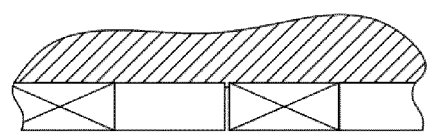
Figure 13F:
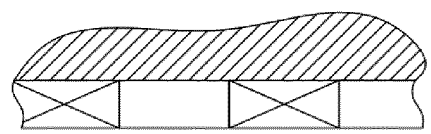

On the other hand, as shown in FIGS. 13*a*-13*f*, the height of the spacer projections may vary too. FIG. 13*a* shows (with the curvatures of the wheel 10 and the drum 19 being omitted for simplicity, the same as in FIGS. 13*b*-13*f*) fragments of two groups of the elements S spaced apart by a distance D and separated by the spacer projection 12 located on the peripheral surface 10' of the wheel 10. FIG. 13*b* shows the same fragments of two groups of the elements S upon their transfer to the channels 23, 123, 223, 323, 423 and 523 on the surface 20, 120, 220, 320, 420 and 520 of the drum 19, 119, 219, 319 419 and 519. These groups S are now separated by the spacer projection 22, 122, 222, 322, 422 and 522 and spaced by their thickness w, the spacer projection having the height h. FIGS. 13*c*-13*f* show the successive transitory stages of the travel of the groups until they leave the drum.

Figure 14:
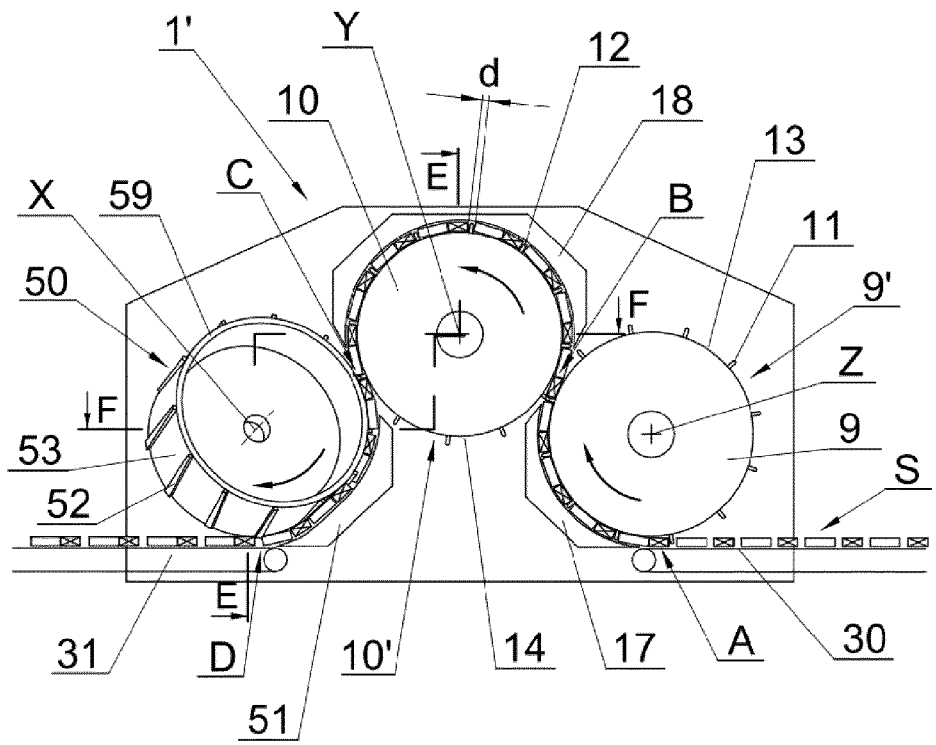
FIG. 14 shows a second embodiment of the apparatus for transporting rod-like elements according to the invention.

FIG. 14 shows a second embodiment of the apparatus 1' according to the invention in which the rod-like elements S are transferred from the wheel 10 into the channels 53 on the rotary drum 59, the thickness of the spacer projections 52 increases from the size w to the size w". Such an embodiment of the drum according to the invention may be used in the situation where the free spaces between the elements S or groups of the elements transported on the preceding wheel 10 are required to be increased in a repeatable way on the drum.

Figure 15:
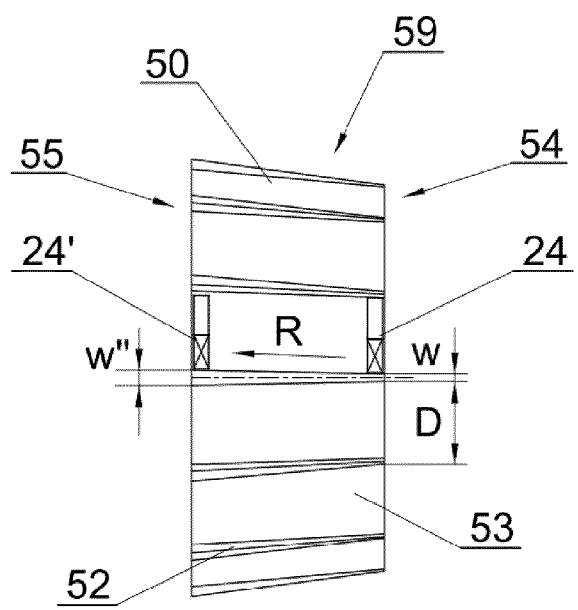
FIG. 15 shows another embodiment of the rotary drum according to the invention having a frustum lateral surface with spacer projections extending along the frustum generating lines that may be used in the apparatus of FIG. 14.

In FIG. 15 an exemplary drum 59 is shown having a frustum lateral surface 50 with the spacer projections extending along straight lines and the groups of elements being moved between them. Other designs of the drum lateral surface 50 and the spacer projections are foreseeable, similarly to the above described embodiments of the drum 19.

The transfer of the rod-like elements S to the first wheel at point A, as well as at the subsequent points B, C and D is realized analogously to the preceding embodiment. Between the points C and D the rod-like elements S move along the channels 53, their movement being forced by the guide means 51 similar to the guide means 21.

The described apparatus, combined with a feeding conveyor device and a collecting conveyor device may be applied in any machine used in tobacco industry for manufacturing multi-element rods and comprising at least one device for feeding the rod-like elements and a typical device for forming and cutting continuous multi-element rods into sections.

Figure 16A:
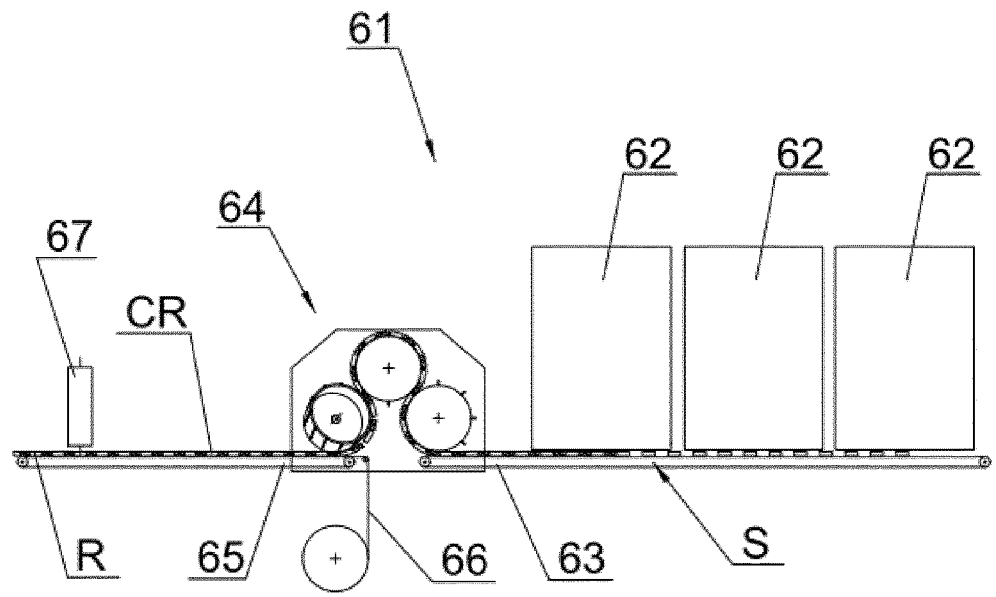
FIGS. 16a and 16b show two embodiments of the machine for manufacturing multi-element rods according to the invention, comprising the apparatus and the drum according to the invention.
Figure 16B:
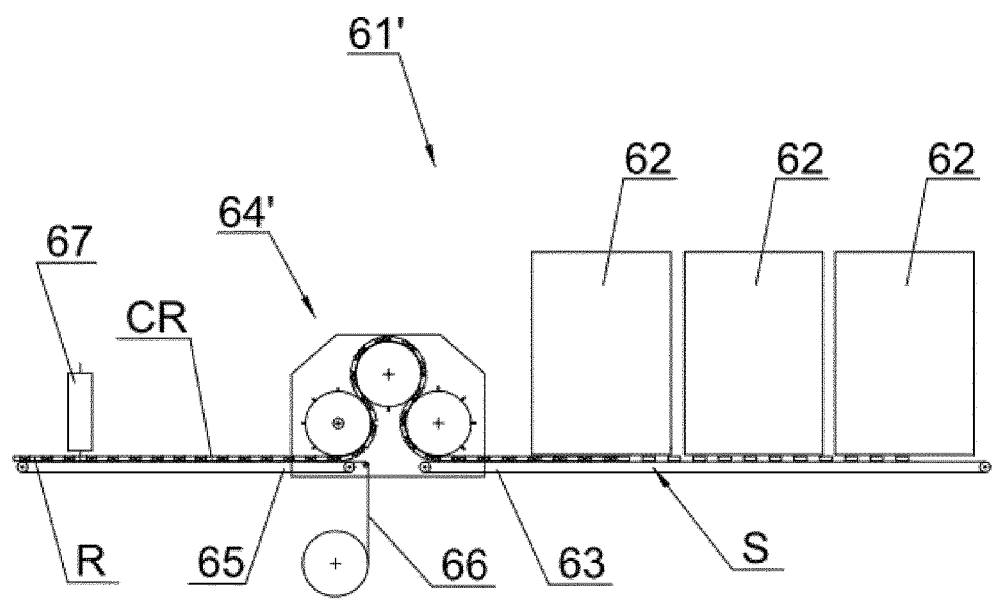

Two examples of the machine according to the invention are shown in FIGS. 16*a* and 16*b*. The machine 61 shown in FIG. 16*a* is equipped with feeding modules 62 for delivering the individual rod-like elements S onto a conveyor 63. On the conveyor 63 the elements are transported to the transferring apparatus 64 comprising two transfer wheels and the rotary drum according to the invention, the drum having its axis of rotation X slanted in relation to the axes of rotation of the preceding wheels and slanted to the horizontal. On the other hand, in FIG. 16*b* a similar embodiment of the machine 61' according to the invention is shown, in which the rotary drum, preceded by the two transfer wheels, has its axis of rotation X parallel to the horizontal and to the axes of rotation of the wheels. In both embodiments of the machine 61, 61', after the multi-element strings of rod-like elements have been obtained in which the elements or groups of elements are spaced apart by the required distances, they are transferred to a collecting conveyor 65, where they are wrapped in paper 66 and glued so that a continuous multi-element rod CR is formed and then cut into single rods by means of a cutting head 67. The sections R may be collected by any suitable known device (not shown).

The invention claimed is:

1. An apparatus for transporting a stream of rod-like elements in tobacco industry machines, in which the rod-like elements are transported successively one by one, comprising:

at least two transfer wheels arranged so that the rod-like elements are conveyed from one wheel to the other, each of the transfer wheels having peripheries configured to convey the rod-like elements arranged one after another, a rotary conveyor drum having a first front base, a second front base, a lateral surface onto which the rod-like elements are delivered successively one by one and an axis of rotation, the axis being slanted in relation to an axis of rotation of a neighboring transfer wheel, the first front base being disposed at a first end of the drum along the axis of rotation and the second front base being disposed at a second end of the drum along the axis of rotation, the lateral surface being provided with spacer projections forming channels of a constant width therebetween, the channels being configured to receive and convey successive rod-like elements, the drum being equipped with a guiding means forcing the rod-like elements to travel in the channels during the rotation of the drum, the wheel and the drum are arranged in such a way that during their rotation in opposite directions around their axes, the drum receives the successive rod-like elements from the periphery of the wheel into the successive channels of its lateral surface, the rod-like elements being oriented substantially transversally to the spacer projections while being conveyed along these channels from the first front base to the second front base during the rotation of the drum, the thickness of the spacer projections varying along the channels.

2. The apparatus according to claim 1, wherein the thickness of the spacer projections decreases substantially to zero in the direction of the travel of the rod-like elements in the channels.

3. The apparatus according to claim 1, wherein the height of the spacer projections decreases substantially to zero in the direction of the travel of the rod-like elements in the channels.

4. The apparatus according to claim 1, wherein the thickness of the spacer projections increases in the direction of the travel of the rod-like elements in the channels.

5. The apparatus according to claim 1, wherein the lateral surface of the drum has a form of a frustum, the spacer projections being elongated and extend substantially from the first front base to the second front base of the frustum.

6. The apparatus according to claim 5, wherein the spacer projections extend along straight lines being the frustum generating lines.

7. The apparatus according to claim 1, wherein the guiding means is constituted by a shield enclosing at least partly the lateral surface of the drum, the shield being optionally fixed and being spaced from the lateral surface so as to enable the rotation of the drum.

8. The apparatus according to claim 1, wherein the shape of the lateral surface of the drum is selected from a group comprising: at least one frustum, a cylinder, a hyperboloid surface and a combination of at least two surfaces from the group.

9. The apparatus according to claim 8, wherein the shape of the lateral surface of the drum is a combination of two frustums or a frustum and a cylinder, and the spacer projections extend along broken lines on the lateral surface of the drum.

10. The apparatus according to claim 9, wherein the spacer projections are arranged at least partially slanted to the lateral surface generating lines.

11. The apparatus according to claim 8, wherein the spacer projections extend on the lateral surface of the drum along hyperbolic lines.

12. An apparatus for transporting a stream of rod-like elements in tobacco industry machines, in which the rod-like elements are transported successively one by one, comprising:

at least two transfer wheels arranged so that the rod-like elements are conveyed from one wheel to the other, each of the transfer wheels having peripheries configured to convey the rod-like elements arranged one after another, a rotary conveyor drum having a first front base, a second front base, a lateral surface onto which the rod-like elements are delivered successively one by one and an axis of rotation, the axis being slanted in relation to an axis of rotation of a neighboring transfer wheel, the lateral surface being provided with spacer projections forming channels of a constant width therebetween, the channels being configured to receive and convey successive rod-like elements, the drum being equipped with a guiding means forcing the rod-like elements to travel in the channels during the rotation of the drum, the wheel and the drum are arranged in such a way that during their rotation in opposite directions around their axes, the drum receives the successive rod-like elements from the periphery of the wheel into the successive channels of its lateral surface, the rod-like elements being oriented substantially transversally to the spacer projections while being conveyed along these channels during the rotation of the drum, the thickness of the spacer projections varying along the channels, and wherein the thickness of the spacer projections decreases substantially to zero in the direction of the travel of the rod-like elements in the channels.

13. An apparatus for transporting a stream of rod-like elements in tobacco industry machines, in which the rod-like elements are transported successively one by one, comprising:

at least two transfer wheels arranged so that the rod-like elements are conveyed from one wheel to the other, each of the transfer wheels having peripheries configured to convey the rod-like elements arranged one after another, a rotary conveyor drum having a first front base, a second front base, a lateral surface onto which the rod-like elements are delivered successively one by one and an axis of rotation, the axis being slanted in relation to an axis of rotation of a neighboring transfer wheel, the lateral surface being provided with spacer projections forming channels of a constant width therebetween, the channels being configured to receive and convey successive rod-like elements, the drum being equipped with a guiding means forcing the rod-like elements to travel in the channels during the rotation of the drum, the wheel and the drum are arranged in such a way that during their rotation in opposite directions around their axes, the drum receives the successive rod-like elements from the periphery of the wheel into the successive channels of its lateral surface, the rod-like elements being oriented substantially transversally to the spacer projections while being conveyed along these channels during the rotation of the drum, the thickness of the spacer projections varying along the channels, and wherein the height of the spacer projections decreases substantially to zero in the direction of the travel of the rod-like elements in the channels.

14. An apparatus for transporting a stream of rod-like elements in tobacco industry machines, in which the rod-like elements are transported successively one by one, comprising:
- at least two transfer wheels arranged so that the rod-like elements are conveyed from one wheel to the other, each of the transfer wheels having peripheries configured to convey the rod-like elements arranged one after another,
- a rotary conveyor drum having a first front base, a second front base, a lateral surface onto which the rod-like elements are delivered successively one by one and an axis of rotation, the axis being slanted in relation to an axis of rotation of a neighboring transfer wheel,
- the lateral surface being provided with spacer projections forming channels of a constant width therebetween, the channels being configured to receive and convey successive rod-like elements, the drum being equipped with a guiding means forcing the rod-like elements to travel in the channels during the rotation of the drum, the wheel and the drum are arranged in such a way that during their rotation in opposite directions around their axes, the drum receives the successive rod-like elements from the periphery of the wheel into the successive channels of its lateral surface, the rod-like elements being oriented substantially transversally to the spacer projections while being conveyed along these channels during the rotation of the drum,
- the thickness of the spacer projections varying along the channels, and
- wherein the thickness of the spacer projections increases in the direction of the travel of the rod-like elements in the channels.

\* \* \* \* \*